United States Patent
Ray et al.

(10) Patent No.: US 10,070,479 B1
(45) Date of Patent: Sep. 4, 2018

(54) APPARATUSES AND METHODS PROVIDING CONTROL OF DATA USAGE AND POWER CONSUMPTION ON CELLULAR NETWORKS

(71) Applicant: Link Labs, Inc., Annapolis, MD (US)

(72) Inventors: Brian Emery Ray, Annapolis, MD (US); Adrian Sapio, Mount Airy, MD (US)

(73) Assignee: LINK LABS, INC., Annapolis, MD (US)

(*) Notice: Subject to any disclaimer, the term of this patent is extended or adjusted under 35 U.S.C. 154(b) by 0 days.

(21) Appl. No.: 15/686,182

(22) Filed: Aug. 25, 2017

(51) Int. Cl.
*H04W 76/28* (2018.01)
*H04W 52/02* (2009.01)
*H04W 72/04* (2009.01)

(52) U.S. Cl.
CPC ....... *H04W 76/28* (2018.02); *H04W 52/0216* (2013.01); *H04W 72/0473* (2013.01)

(58) Field of Classification Search
CPC ........... H04W 76/048; H04W 52/0216; H04W 72/0473
See application file for complete search history.

(56) References Cited

U.S. PATENT DOCUMENTS

2016/0302024 A1* 10/2016 Bennett .................. H04W 4/70

OTHER PUBLICATIONS

3GPP TS 23.682 V13.9.0 (Jun. 2017).*
"3GPP Low Power Wide Area Technologies," GSMA White Paper, as published Oct. 7, 2016 re https://www.gsma.com/iot/3gpp-low-power-wide-area-technologies-white-paper/, pp. 1-49.
"3GPP Standards for the Internet-of-Things," Philippe Reininger, 3GPP, Nov. 2016, pp. 1-17.

* cited by examiner

*Primary Examiner* — Jae Y Lee
(74) *Attorney, Agent, or Firm* — Charles B. Lobsenz; Brian H. Buck; Potomac Law Group, PLLC

(57) ABSTRACT

Provided are apparatuses and methods for control of each of data usage and power consumption of cellular network services. Based on such control, a consumer cost of that data usage is reduced, and a battery life of a device for carrying out data communications is increased.

27 Claims, 12 Drawing Sheets

TX: Transmit

RX/TX: Receive/Transmit
    A: Paging/Idle Window (5.12 seconds each)
    B: eDRX Cycle of N Hyper-Frames (HF) (10.24 seconds each)

FIG. 8A

| UPLINK FIELD | DOWNLINK FIELD | PRIORITY BIN |
|---|---|---|
| 1 – Register Reading | 1 – Valve Position | A - Immediate |
| 2 – Valve Position | 2 – Firmware Binary | B – Per 60 minutes / when connected |
| 3 – Flooded Boolean | 3 – Debug Level | C – 0300 Everyday |
| 4 – SW Version | 4 – Reset Register | D – When requested only |
| 5 – Log Message | 5 – Binary (Firmware Over-The-Air (FOTA)) | |

FIG. 9A

| UPLINK FIELD | DOWNLINK FIELD | PRIORITY BIN |
|---|---|---|
| 1 – Alarm Occurrences | 1 – Alarm Occurrence Read Rate | A - Immediate |
| 2 – Alarm Type | 2 – Alarm Volume (Max.) | B – Per 60 minutes / when connected |
| 3 – Version Number | 3 – Commands | C – 0300 Everyday |
| 4 – Log Message | 4 – Debug Level | D – When requested only |
|  | 5 – Binary (Firmware Over-The-Air (FOTA)) |  |

APPARATUSES AND METHODS PROVIDING CONTROL OF DATA USAGE AND POWER CONSUMPTION ON CELLULAR NETWORKS

FIELD OF THE DISCLOSURE

Disclosed embodiments relate to wireless communications in licensed spectrum bands, and more specifically, to Long Term Evolution Machine Type Communications Category M1 (hereinafter "LTE-M") prescribed wireless communications among compatible devices and networks.

BACKGROUND

As is widely recognized, LTE is a standard governing wireless communications between devices such as mobile phones and data terminals on the one hand and base stations/eNodeB elements on the other hand. The standard was developed by the 3GPP (3rd Generation Partnership Project), which periodically issues updates in response to the ever increasing flux in the demands of the telecommunications industry and consumers of its products. The updates are commonly referred to as, "Releases." Often, the Releases are prompted by a variety of needs including, for example, a desire to increase the efficiency of operations between devices with minimal change to the operation and infrastructure of the network of a service provider. In other words, the costs related to device manufacture, compatibility of the network and services to be provided by the network are often paramount concerns when devising a particular Release.

Circa 2009, the Internet was in a stage of its evolution in which the backbone (routers and servers) was connected to edge nodes formed primarily by personal computers. At that time, Kevin Ashton (among others) looked ahead to the next stage in the Internet's evolution, which he described as the Internet of Things ("IoT"). In his article, "That 'Internet of Things' Thing," RFID Journal, Jul. 22, 2009, he describes the circa-2009-Internet as almost wholly dependent upon human interaction, i.e., he asserts that nearly all of the data then available on the internet was generated by data-capture/data-creation chains of events each of which included human interaction, e.g., typing, pressing a record button, taking a digital picture, or scanning a bar code. In the evolution of the Internet, such dependence upon human interaction as a link in each chain of data-capture and/or data-generation is a bottleneck. To deal with the bottleneck, Ashton suggested adapting internet-connected computers by providing them with data-capture and/or data-generation capability, thereby eliminating human interaction from a substantial portion of the data-capture/data-creation chains of events.

In the context of the IoT, a thing can be a natural or man-made object to which is assigned a unique ID/address and which is configured with the ability to capture and/or create data and transfer that data over a network. Relative to the IoT, a thing can be, e.g., a person with a heart monitor implant, a farm animal with a biochip transponder, an automobile that has built-in sensors to alert the driver when tire pressure is low, field operation devices that assist fire-fighters in search and rescue, personal biometric monitors woven into clothing that interact with thermostat systems and lighting systems to control HVAC and illumination conditions in a room continuously and imperceptibly, a refrigerator that is "aware" of its suitably tagged contents that can both plan a variety of menus from the food actually present therein and warn users of stale or spoiled food, etc.

In the post-2009 evolution of the Internet towards the IoT, a segment that has experienced major growth is that of small, inexpensive, networked processing devices, distributed at all scales throughout everyday life. Of those, many are configured for everyday/commonplace purposes. For the IoT, the edge nodes will be comprised substantially of such small devices.

Within the small-device segment, the sub-segment that has the greatest growth potential is embedded, low-power, wireless devices. Networks of such devices are described as comprising the Wireless Embedded Internet ("WET"), which is a subset of IoT. More particularly, the WET includes resource-limited embedded devices, which typically are battery powered, and which are typically connected to the Internet by low-power, low-bandwidth wireless networks ("LoWPANs").

In 2016, the 3GPP issued its Release 13. This Release addressed revisions to the LTE (4G) standard for LTE-M prescribed communications. Such revisions particularly focused on addressing aspects aimed at enabling the following: reduced cost of LTE devices for a wide variety of IoT applications; improved battery life for such devices when executing such applications; and improved network coverage enabling users to accomplish desired goals.

Generally, Release 13 addresses a low-power, wide-area network (LPWAN) technology for the IoT enabling decreased device complexity in regard to operation with an existing LTE network. More specifically, and in order to accomplish the aforementioned decrease in device complexity, the Release provides for several reductions in comparison to LTE maximums. They include reductions in each of maximum bandwidth, maximum transmission/reception rates, and maximum transmission power. Accordingly, devices operating in accordance with these reductions require less componentry, and are thus less expensive to produce. At the same time, and owing to their less sophisticated design, such devices draw less power and thus conserve battery reserve, while at the same presenting a substantially lesser burden on the network with which they are connected. Further provided by Release 13 is an adaptability for variation of power mode, also enabling a device to experience significant battery conservation.

Across the broad spectrum of IoT applications including, but not limited to, wearables, smart metering, sensor systems, and asset tracking, LTE-M represents a highly beneficial framework in at least the following respects. First, as a device's required complexity decreases, so does its cost. Second, because of such decreased complexity, the incumbent network, likewise, experiences a reduced cost of adaptation. Third, due to decreased power burden on the device, battery life may be extended significantly. Fourth, since data transmission rates are decreased, so are the actual monetary costs of data services provided by the LTE network provider.

An example use case in which LTE-M is highly desirous is a situation in which smart metering provides for the communication of a relatively small amount of data, i.e., a meter reading, at a scheduled time.

Accordingly, it would be desirable to optimize the implementation of LTE-M communication so as to improve the cost-benefit environment associated with conducting such metering and other applications in which LTE-M is pertinent, in accordance with, for example, varied scheduling for the occurrence of communications, varied environmental (i.e., device and/or network) conditions in/under which operations occur, and varied "demand" operation resulting from commands for such operation.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

In certain embodiments, the disclosed embodiments may include one or more of the features described herein.

An aspect of the embodiments includes a Long Term Evolution Machine Type Communications Category M1 (LTE-M) apparatus, including a communications platform, including a communicator configured to carry out LTE-M communications to and from an LTE-M enabled network, and a controller operatively connected with the communicator, and configured to determine, based upon instructions stored therein, a substance, a format and a transmission timing of an LTE-M communication to the network, the controller being configured for operative connection with a host controller and an information resource operatively connected with the host controller, the host controller being configured to control an operation and/or property of the information resource via communication with the communicator.

A further aspect of the embodiments includes a method of conducting Long Term Evolution Machine Type Communications Category M1 (LTE-M) communications between a node and a network in which each of the node and the network are LTE-M enabled, the method including initializing the node for communication with the network, transmitting, from the node, one or more parameters corresponding to each of node-specific information, information of the network, and a timing for transmitting a communication from the node, to the network, and in response to the transmitting, communicating to the network at least node-specific information in accordance with the one or more respectively corresponding parameters.

A further aspect of the embodiments includes, in a system comprising a Long Term Evolution Machine Type Communications Category M1 (LTE-M) enabled node configured for operation with a LTE-M enabled network, each of the node and the network being configured to transmit and receive communications therebetween, the node including a framework defining the substance of, the format of and the timing for transmitting a communication from the node, in which the node is configured to be operable in power modes each corresponding to a respective level of power consumption of the node resulting from a frequency of communications received by and transmitted from the node.

A further aspect of the embodiments includes a Long Term Evolution Machine Type Communications Category M1 (LTE-M) enabled communications apparatus configured to communicate with a LTE-M enabled network, the apparatus including one or more processors executing instructions from a memory for causing the apparatus to be operable according to a framework of parameters and in one or more of a plurality of selected power modes, any one of the power modes and/or settings thereof being selectable in response to a communication received from/via the network.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein:

FIGS. 8, 8A and 8B provide an illustration of a first exemplary use case in accordance with FIGS. 1-7; and FIGS. 9-9A provide an illustration of a second exemplary use case in accordance with FIGS. 1-7.

DETAILED DESCRIPTION

Figure 1:
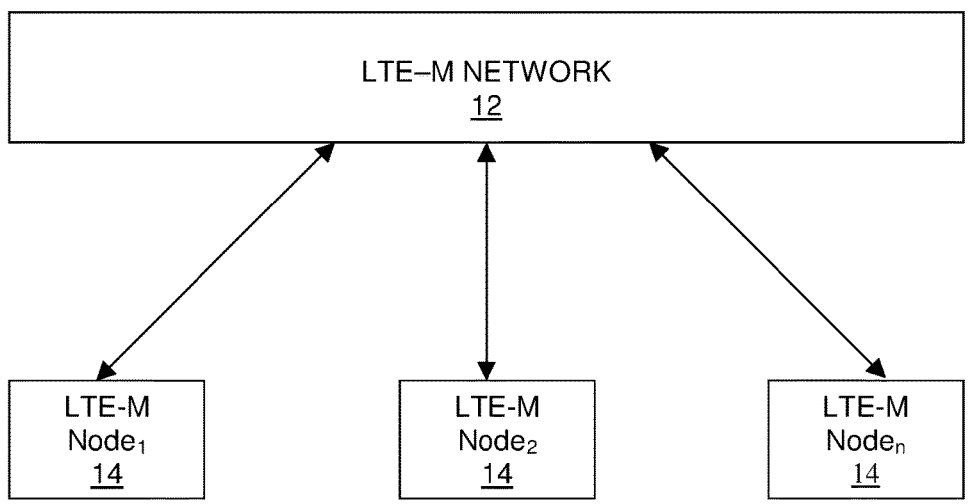
FIG. 1 is an illustration of a system for LTE-M communications between a LTE-M enabled node and a LTE-M enabled network.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, it is apparent that the present embodiments can be carried out in a variety of ways, and does not require any of the specific features described herein. Also, well-known functions or constructions are not described in detail since they would obscure the present embodiments with unnecessary detail.

The description is not to be taken in a limiting sense, but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol, or other specification and/or guidelines which may be applicable to the transfer of information. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques or any other techniques enabling the transfer of information. Examples of such wireless devices include cellular telephones, desktop computers, laptop computers, handheld computers, electronic games, portable digital assistants, MP3 players, DVD players, or the like.

With the permeation of IoT technologies into today's society, efforts continue to grow towards maximizing convenience and reducing service and device costs of service suppliers and manufacturers of wireless devices. LTE-M technology offers the ability to address these efforts. As referenced hereinabove, 3GPP's Release 13 specifies the particular aspects of battery-powered, wireless devices equipped to operate with a LTE 4G cellular network. Such aspects are recorded in Table 1 appearing below.

TABLE 1

| LTE-M (Release 13) | |
|---|---|
| Maximum System Bandwidth | 1.4 MHz |

TABLE 1-continued

LTE-M (Release 13)

| | |
|---|---|
| Downlink Peak Rate | 1 Mbps |
| Uplink Peak Rate | 1 Mbps |
| Duplex | Half |
| Number of Antennas | 1 |
| Maximum Transmit Power (UE) | 23 or 20 dBm |
| Estimated Modem Complexity Compared to Conventional LTE | 20% |

As will be appreciated from the above Table 1, LTE-M enables the ability for wireless device manufactures to provide low-cost, efficient power solutions for the transfer of small amounts of data which need to be transmitted intermittently. Still more, LTE-M further enables widespread coverage since a connection may be obtained/maintained virtually anywhere where 4G service is available, without a gateway and with the only service/network adaptation being that a cellular service provider need only install appropriate software to enable cooperation with a LTE-M enabled wireless device.

In view of such advantages, and the ease with which consumers may benefit from them, the present embodiments focus on the goal of optimizing the consumer experience of using an LTE-M device. Factors contributing to the achievement of this goal include, for example, decreasing a consumer cost of both using a wireless service/network and of the device itself, and extending a battery life of an LTE-M device. More particularly, the present embodiments are aimed at controlling data usage by a user of a LTE-M device so as to provide for decreased network service costs, but also decreased processing effort by the LTE-M device itself.

Figure 8:
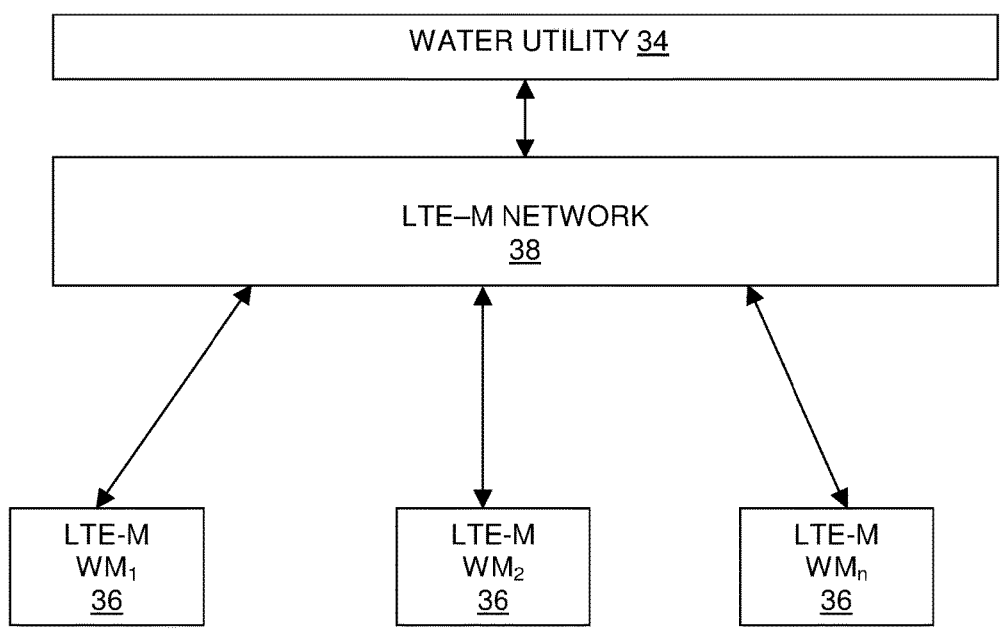
Figure 9:
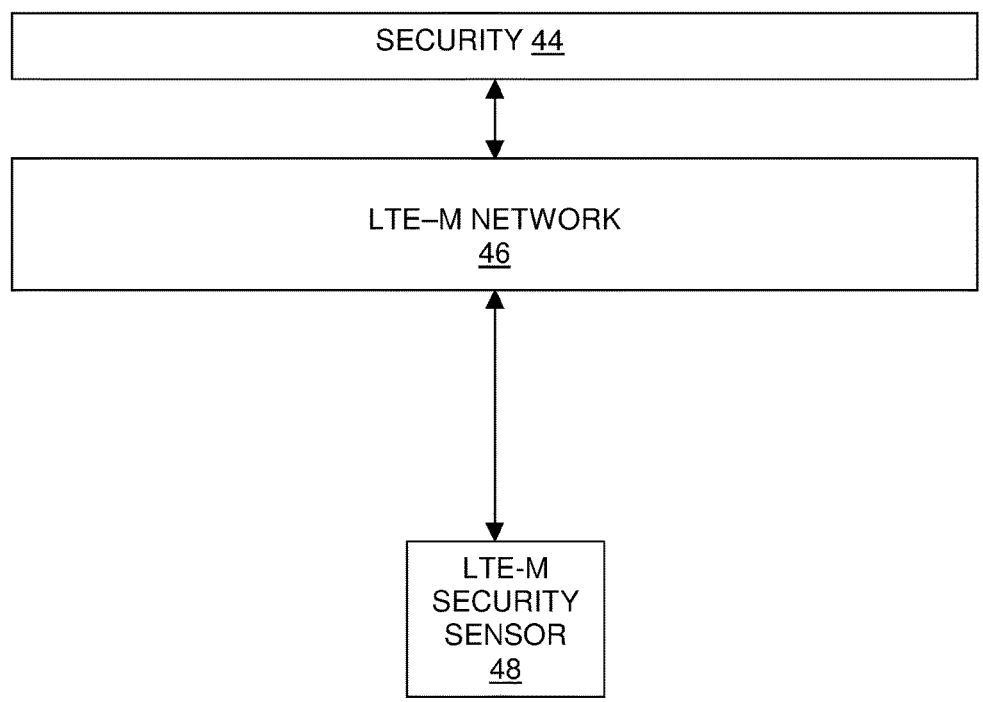

In these regards, the FIGS. 1-7 illustrate apparatuses and methods for controlling data usage and extending battery life when carrying out LTE-M communications. FIGS. 8-9A illustrate exemplary use cases in which such apparatuses and methods of FIGS. 1-7 are employed to achieve the aforementioned communications.

Now, in turning to FIG. 1, there is illustrated a system 10 for conducting direct LTE-M communications between a back-end LTE-M enabled network and/or service 12, such as a network as a service (NaaS) including a virtual private network (VPN), and one or more front-end LTE-M enabled, battery-powered devices or nodes 14. Herein, the terms "network" and "service" are used interchangeably, in which the term, "network," is referenced below in the interest of brevity. Also, the terms, "communication" or "communications" define each of any form of data and/or its transfer, including, for example, messaging, commands, and/or device/network update information, etc.

As shown, the network 12 and the nodes 14 are operable for bi-directional communications therebetween so as to be able to transmit and receive information in the form of data when carrying out LTE-M communications. It is to be understood that such communications with the network 12 may occur between one or more of the nodes 14 at discrete times or simultaneously.

Figure 2:
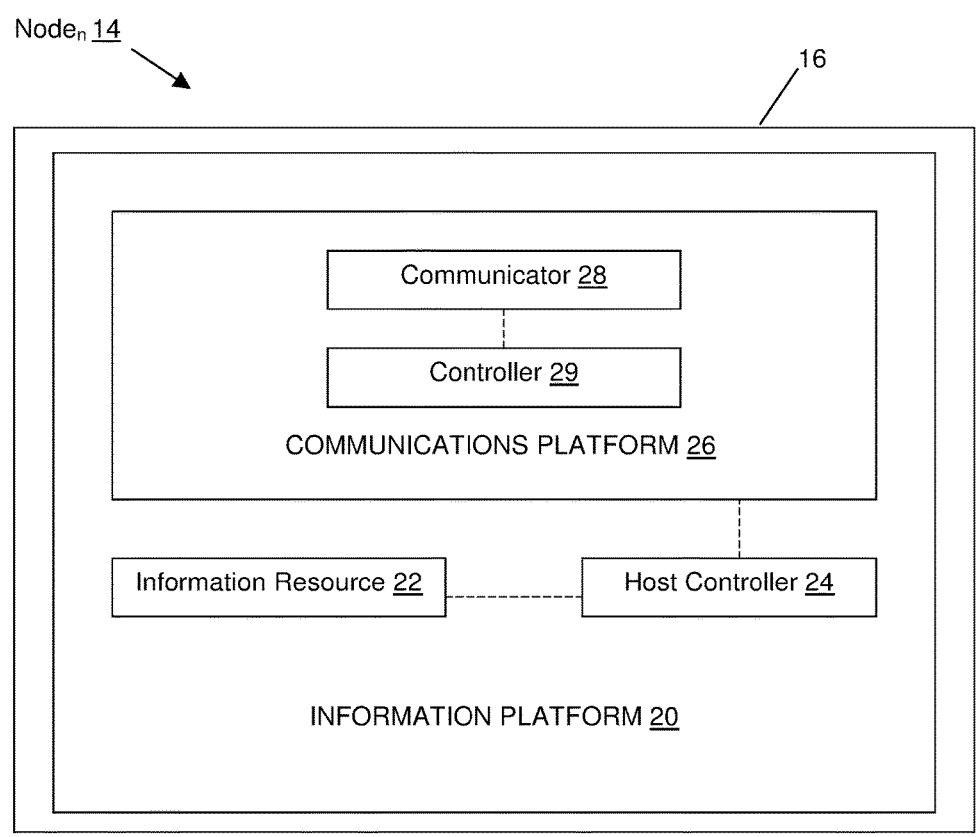
FIG. 2 is an illustration of a node according to FIG. 1.

FIG. 2 illustrates a configuration of a Node, 14 of FIG. 1. Therein, node 14 optionally comprises an enclosure 16 on which one or more manufacturer or other designations may be included. Within the enclosure 16, there is provided an information platform 20 containing, optionally, one or more information resources 22, such as one or more sensors, metering configurations, or other information providing configurations enabling the collection of respectively corresponding information. Operatively connected with one or more of the information resources 22 is a host controller 24 for controlling or determining a property of the one or more information resources 22, such as, for example, sensitivity in the case of a sensor. To accomplish this control or determination, host controller 24 is operatively connected with the communications platform, discussed below, so as to enable a provider of the information platform 20 to access resources thereon through an appropriate application programming interface (API).

Configured atop the information platform 20 is a communications platform 26 for enabling communications between the network 12 and the node 14.

Communications platform 26 comprises an LTE-M enabled communicator 28, such as a LTE-M enabled modem in accordance with Table 1 above, and, as shown, a separate controller/microcontroller 29 having one or more processors and being operatively connected with the communicator 28, although it will be understood that controller 29 may be integrated with communicator 28. Communicator 28 and controller 29 are operatively connected with host controller 24, and include all appropriate software, including instructions stored in a memory of controller 29, and/or hardware for carrying out the LTE-M communications described herein, which may include operational updates transmitted by the network 12 that affect the manner of operation of communicator 28 and/or controller 29.

With respect to the above configuration of the node 14, it is to be understood that communications platform 26, including its communicator 28 and controller 29 may be separately configured so as to comprise a stand-alone user equipment (UE). In this way, it is to be understood that a node 14, as described hereinabove, or communications platform 26 itself, may each comprise a UE defining a node enabling communications with the network 12.

When engaging in communications with the network 12, a node 14 is configured to be operable in a plurality of power modes comprising a conventional LTE-M power mode, a Power Saving Mode (PSM) and an extended idle-mode Discontinuous Reception (eDRX) Mode (herein, "extended Discontinuous Reception (eDRX) Mode"). In contrast to conventional operation, each of the PSM and eDRX Mode enable the node 14 to conserve battery life through limiting opportunity for communications with the network 12. That is, each of the PSM and eDRX Mode provide for various node operating states in which the node 14 is essentially "powered off" for predetermined amounts of time.

Figure 3:
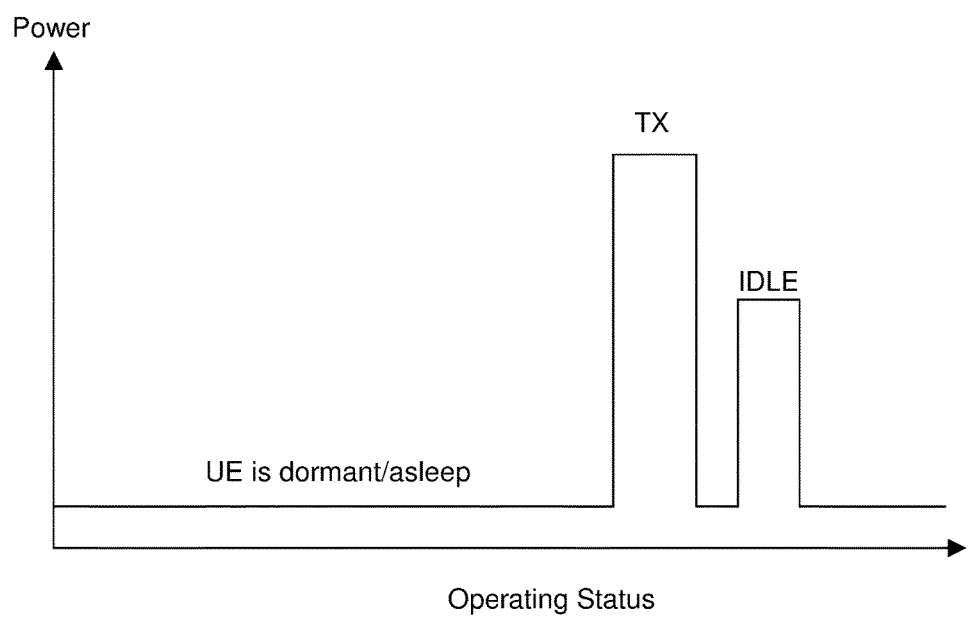
FIG. 3 is an illustration of the power consumption of the node of FIG. 1 when operating in a Power Saving Mode (PSM)

Specifically, in PSM, the UE/node 14, and particularly the communicator 28, is configured to communicate to the network 12 that it will be dormant or asleep until it needs to transmit information from the node 14. As shown in FIG. 3, a transmit, or "TX," operation is followed by a brief period in which the node 14 remains in an idle status in which it is reachable by the network 12 via paging to receive various communications therefrom. After the expiration of the idle status, the node 14 lapses back into a dormant state in which the node 14 is unable to receive communications from the network 12. Hence, power consumption of the node 14 is minimized based on an ability to schedule a "wake-up" interval following the TX operation and which defines the length of the idle period. The "wake-up" interval is configured at the node 14 itself, and may be established through communications to the node 14 from the network 12. In this way, one or more back-end devices in communication with the network 12 may establish/control the length of the wake-up interval so as to control how long the node 14 is operable to receive communications following a requisite preceding transmission, and therefore, also to control a power consumption by the node with respect to how often and how long it must operate in its idle status as opposed to being dormant.

Figure 4:
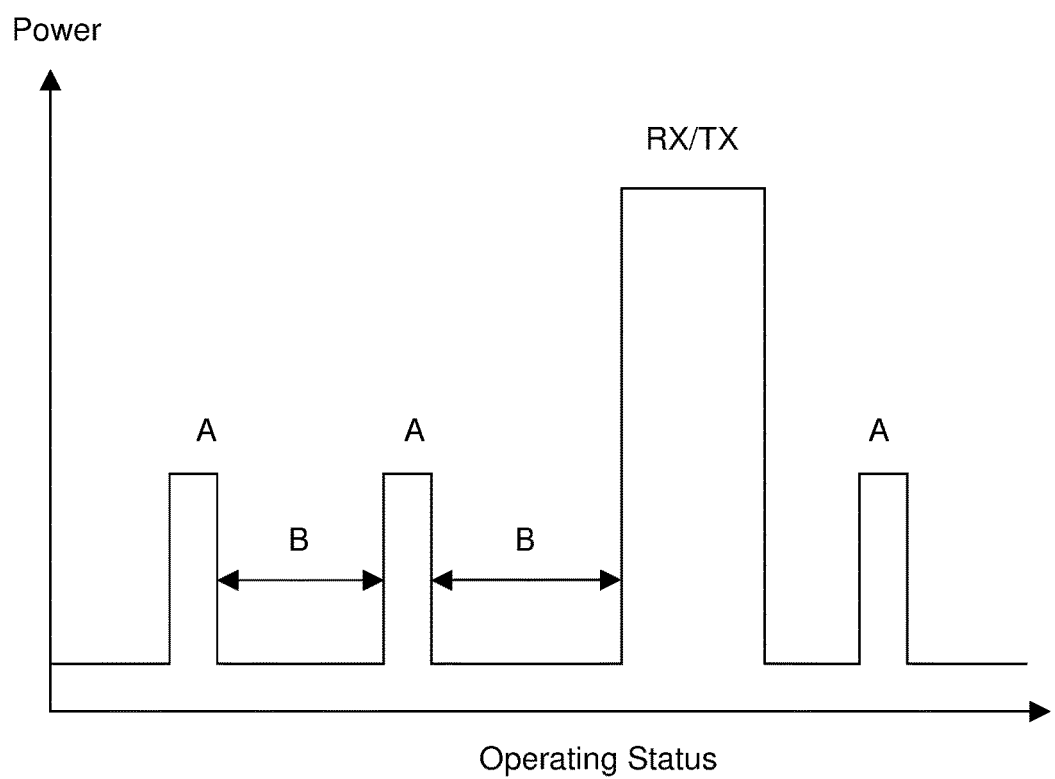
FIG. 4 is an illustration of the power consumption of the node of FIG. 1 when operating in an extended Discontinuous Reception (eDRX) Mode.

In contrast, the UE/node 14, and particularly the communicator 28, is alternatively configured to be operable in eDRX Mode. During such operability, the node 14 communicates to the network 12 its sleep or "eDRX cycle" B, as shown in FIG. 4 and which is defined by a given number of "N" Hyper-Frames/eDRX Cycle Lengths of 10.24 seconds each between idle states/paging windows A in which the node 14 is reachable via paging. In accordance with Release 13, the eDRX cycle may be set up to 40 minutes. In other words, a node's power consumption owing to the occurrence of idle states and a period or periods of reception/transmission "RX/TX," may be regulated in accordance with a setting of the eDRX cycle. Similarly as in the case of PSM, the eDRX cycle length may be set by one or more back-end devices in communication with the network 12 so as to control a frequency of reception/transmission of communications from the node 14.

In one or more embodiments herein, it is to be understood that a node 14 may be configured to operate according to PSM and/or eDRX throughout communications with the network 12. As will also be understood, a node remains connected with the network 12 when operating in PSM, and thus is available to transmit to the network when necessary, though reception must be deferred until a wake-up interval occurs. On the other hand, in eDRX Mode, a node 14 may receive communications from the network 12 during an idle period or scheduled reception, and receive and/or transmit to the network 12 between eDRX cycles in accordance with, for example, a corresponding communications schedule.

Figure 5:
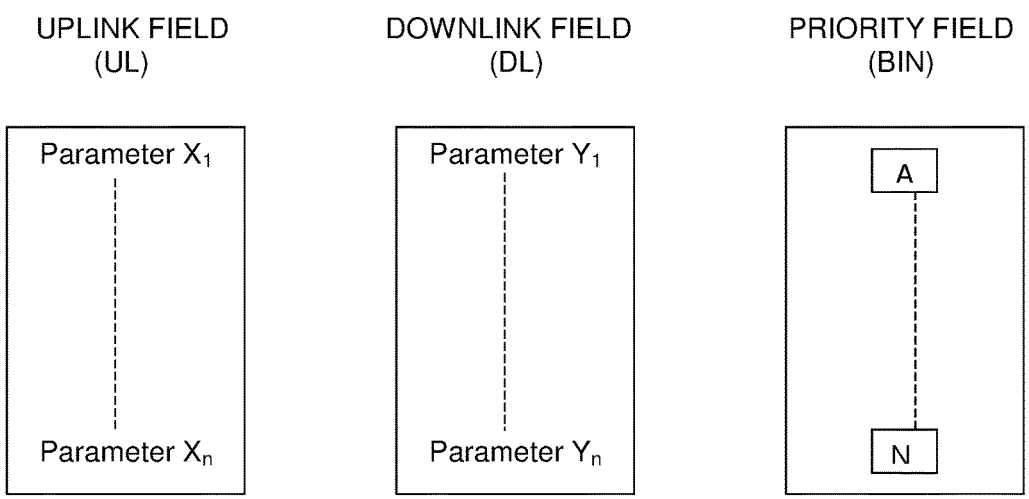
FIG. 5 is an illustration of a framework of information to be exchanged during LTE-M communications according to FIG. 1.

In turning to FIG. 5, illustrated therein is a framework 30, established by the communications controller 29 in response to messaging from the host controller 24, for the exchange of information between a node 14 and the network 12. The exchange may occur during any of the power modes just discussed. Such framework 30, as determined by the messaging from the host controller 24, provides for an array of categories including an Uplink (UL) Field, Downlink (DL) Field and Priority Field/Bin ("Priority Bin" hereinafter), and is contemplated to be configured in accordance with a respective IoT application corresponding to information platform 20.

Each of the UL and DL Fields are contemplated to include a variety of Parameters $X_{1-n}$ and $Y_{1-n}$, respectively. Parameters $X_{1-n}$ correspond to one or more properties of a single or several configuration(s) of the information platform 20 and/or other node 14 components themselves. Parameters $Y_{1-n}$ correspond to one or more pieces of information of the information platform 20 and/or configurations of the node 14 and/or network 12. Priority Bins A through N correspond to optional timings for communications to occur from the node 14 to the network 12. For example, as will be explained later with reference to FIGS. 8-9A, and in accordance with the aforementioned UL and DL Fields and Priority Bins, one or more information of the information platform 20 could be scheduled for immediate communication to the network 12 once the node 14 is initialized and the information is available for such communication. Such communication, it is to be understood, defines a substance and format of the one or more information in accordance with each of the UL Fields and DL Fields, and Priority Bins define a timing of such communication. Thus, by defining a communication in terms of UL and DL Fields, instead of full descriptors for those fields, a processing burden for both the node 14 and the network 12 is minimized. Consequently, battery usage at the node 14 and network resource consumption are each decreased when compared to legacy LTE operations.

Figure 6:
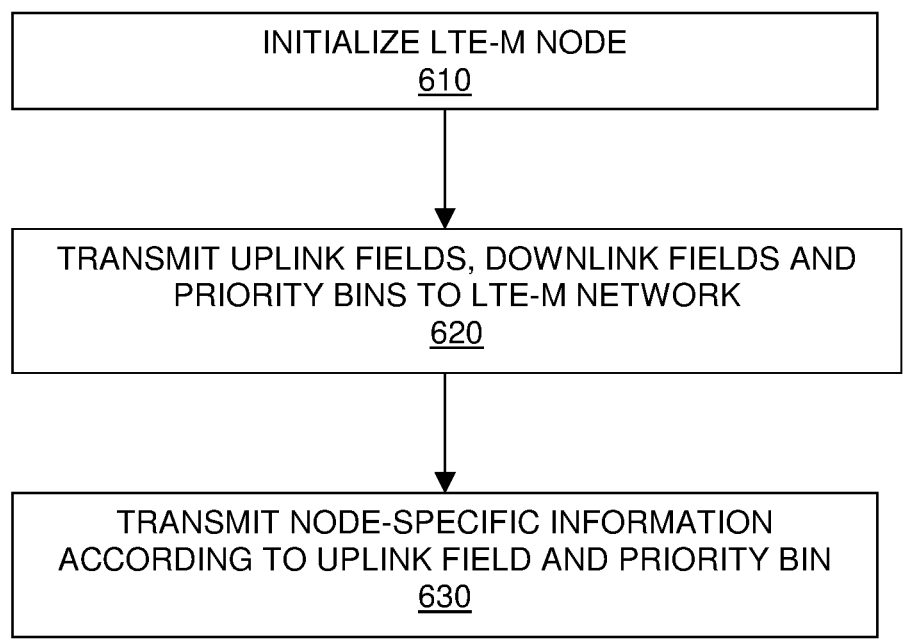
FIG. 6 is a sequence diagram of LTE-M communications from a node of FIG. 1 to the network thereof, according to one or more portions of the framework of FIG. 5.

Referring to FIG. 6, there is provided a sequence for operation of a node 14 of FIG. 1 in order to carry out LTE-M communications of the present embodiments.

Therein, node 14 is initialized at decision block 610 to be operable in a preset LTE-M power mode. At decision block 620, node 14 communicates framework 30 to the network 12 in response to communications controller 29 receiving a message from host controller 24 to establish the framework 30. In response to communication of the framework 30 to the network 12, node 14 further communicates, at decision block 630 and according to UL Fields and Priority Bins, node-specific information, as derived, for instance, from one or more information resources 22 contained on the information platform 20. As such, it to be understood that the term, "node-specific information," as used herein, may include one or more portions of information according to framework 30. Further, it is also to be understood that the terms "initialize" and "initialized" refer to a state of operation in accordance with framework 30. In other words, the node 14 may be initialized, for example, upon a beginning of its operation, i.e., when it is booted from an offline status, and alternatively, when it has received one or more communications from the network 12 changing one or more aspects of framework 30 and/or of the node 14 itself, including the power mode thereof and/or a setting thereof.

Figure 7:
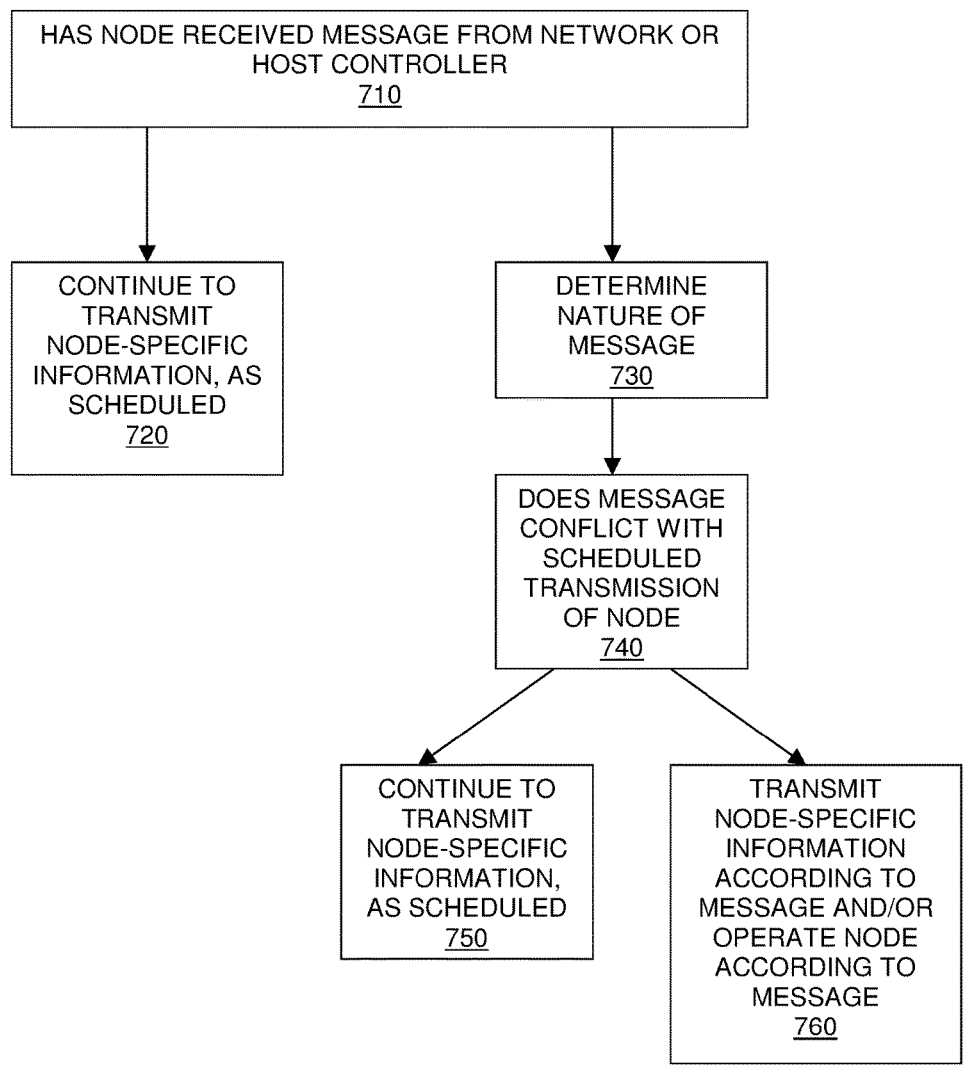
FIG. 7 is a sequence diagram regarding LTE-M communications from the network of FIG. 1 to a node thereof, in accordance with the framework of FIG. 5.

Continuing to FIG. 7, node 14, through controller 29, determines, at decision block 710, whether a message has been received from the network 12 or host controller 24. In this regard, such message is contemplated to be in accordance with one or more of the UL and DL Fields and Priority Bins of FIG. 5. Furthermore, it will be understood that the term "message" comprises one or more data in accordance with all suitable messaging compression and protocols appropriately applicable for the accomplishment of LTE/LTE-M communications. For example, such compression may include User Datagram Protocol (UDP) or Transmission Control Protocol (TCP), and exemplary protocols may include (Constrained Application Protocol (CoAP), Message Queue Telemetry Transport (MQTT), Hyper Text Transfer Protocol (HTTP) or a custom binary protocol.

If a message has not been received, flow continues to decision block 720 such that continued, scheduled transmission of communications from the node 14 in accordance with framework 30 remains uninterrupted.

If a message has been received from the network 12 or host controller 24, node 14, through controller 29, determines the nature of the message at decision block 730. That is, node 14 analyzes the message to ascertain whether the message relates to information of one or more UL fields and/or whether such message includes one or more instructions pertaining to operation of the node 14 in accordance with one or more Fields of framework 30, including, for instance, one or more DL Fields and/or the information platform 20 and its information resources 22. Once the analysis is complete, node 14 further determines at decision block 740 whether the message conflicts with one or more scheduled transmissions in accordance with the UL Fields and Priority Bins of FIG. 5.

If no conflict is determined, flow continues to decision block 750 such that continued, scheduled transmission of communications remains uninterrupted. If a conflict does exist, node 14, through controller 29, operates, at decision block 760, to transmit node-specific information thereof to the network 12 according to the message and/or operate the node 14 according to the message. In this regard, it is to be understood that such message from the network 12 or host controller 24 may include information maintaining or changing one or more aspects of the information to be transmitted from the node 14, the manner of operation of the node 14 and/or operation(s) of one or more information resources 22 of the information platform 20.

In the context of FIGS. 1-7, embodiments of the present disclosure are made applicable in any number of scenarios where LTE-M communications are contemplated to occur, such that a network gateway is unnecessary and a battery-life of an LTE-M device is significantly extended when compared to conventional LTE battery consumption.

Whereas such embodiments are envisioned to apply in any situation providing LTE-M device and network compatibility, FIGS. 8-9A provide exemplary use cases of optimizing LTE-M operations to maximize reductions in both data usage and battery consumption.

Thus, FIG. 8 illustrates an exemplary use case demonstrating the system of FIGS. 1 and 2 in which the nodes 14 of FIGS. 1 and 2 are envisioned as being made operable in accordance with a water metering system 32 administered by a user such as a water utility 34.

Accordingly, each node 14 of FIGS. 1-2 is embodied as a LTE-M enabled water meter (WM) 36 communicable with a LTE-M enabled network 38 selected by the water utility 34. In these ways, the water utility 34 may communicate via network 38 to change one or more parameters of framework 30 and to learn node-specific information to be provided by a given water meter 36.

As shown in FIG. 8A, an exemplary framework 30 includes: UL Fields having the following parameters: "1" or "Register Reading", "2" or "Valve Position, "3" or "Flooded Boolean," "4" or "Software Version (SW Version)," and "5" or "Log Message;" DL Fields having the following parameters: "1" or "Valve Position," "2" or "Firmware Binary," "3" or "Debug Level," and "4" or "Reset Register Reading;" and Priority Bins having the following parameters: "A" or "Immediate," "B" or "Per 60 minutes/when connected," "C" or "0300 everyday," and "D" or "When requested only."

In use, upon initialization of a meter 36, framework 30 is transmitted to the network 38. Once transmitted, messaging from the meter 36 will occur in accordance with preset UL Fields and a preset Priority Bin. For example, if the utility desires a usage reading every hour, meter will communicate such usage as, say, "B-1=53." Knowing, for instance, that the usage is measured in gallons, the utility is made aware that a customer is consuming an amount of 53 gallons of water every hour, for a predetermined reporting cycle.

Based on the given syntax of the messaging established by the UL Fields of the described framework 30 transmitted from the meter 36 upon its initialization, the utility 34 is aware of each of the substance and format of the node communication. In other words, it is unnecessary to transmit the descriptors of the fields. As a result, an amount of data usage is controlled, thereby controlling a cost of such usage. Further, processing burden on meter 36 in transmitting the usage reading according to framework 30 is likewise minimized, thus optimizing battery consumption.

Figure 8B:
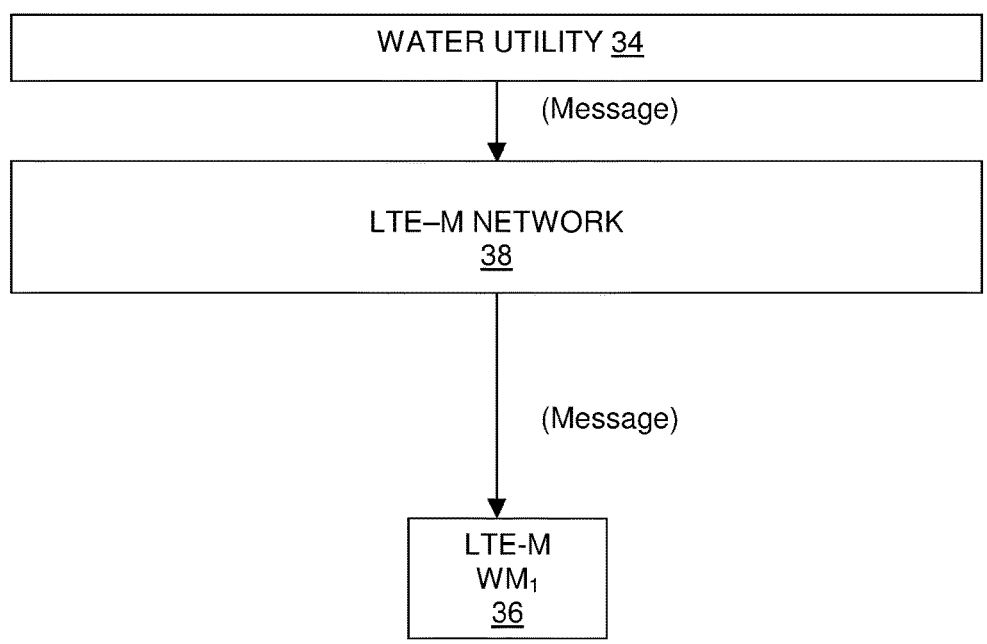

In the event that the utility 34 is desirous of changing one or more of the UL Fields, the utility, via network 38, may message the meter 36, as is shown in FIG. 8B, based upon one or more DL Fields.

Taking the case in which, upon initialization of the meter 36, a daily reading was initially scheduled to be transmitted to the utility at 0300 everyday in accordance with syntax, "C-1," an alternate reading may be obtained.

To accomplish this, utility 34 need only recode the already transmitted UL Fields such that upon further initialization of the meter prestored UL Fields will be overwritten upon further initialization of the meter 36.

To illustrate, the timing of "0300 everyday" could be revised to "0400 everyday." An associated message from utility 34 may read, for example: Target meter: address of meter, Field Parameter: {5}, Value: {C=0400 Everyday}. In this way, the utility 34 is enabled to more readily address needs of its consumers and its own operating efficiency by, for instance, altering the meter 36 reporting time so as to comport with a more attractive, i.e., inexpensive, time of day during which data usage is less costly for communications from the meter 36 to the network 38. Furthermore, it is to be understood that, alternatively, if meter 36 is connected to network 38 for some purpose other than a scheduled communication, meter 36 may also be configured to communicate information thereof during that connection. For example, meter 36 may communicate a register reading in accordance with parameter 1 of the described UL Fields when a firmware download according to parameter 5 of the described DL Fields occurs.

To further illustrate the cooperability between a meter 36 and the network 38, a user of the meter 36, such as the utility 34, may further control an operation of the meter 36 based on the above-discussed framework 30 of UL and DL Fields and Priority Bins.

For example, and assuming that the utility 34 is desirous of altering a position of the metering valve from "open" to "closed," the utility 34 need only post a message to the network 38, as is shown in FIG. 8B and in the following form, optionally including: Target meter: address of meter, Field Parameter: {1}, Value: {Close}.

Upon posting of the message and initialization of the meter 36, and through operative connection between the information platform 20 and the host controller 24, the value of DL Field Parameter 1 (representing "Valve Position") will be updated to, "Close." Once closure is confirmed, host controller 24 then communicates this event to the communicator 28 and controller 29 in the form of message, "A-2: Closed." Based upon this messaging, and namely the priority or "immediate" behavior with which the host controller 24 acted to close the valve, the meter 36 would then send this same message to the network 38, with the same priority, so as to confirm completion of the operation requested via the network 38 to the utility 34.

FIG. 9 illustrates an exemplary use case regarding a sensor system 40 including, for example, a security 42 employing one or more security sensors, only one or which is shown therein for purposes of illustration. Security 42, in accordance with FIGS. 1-7, is communicable with a LTE-M enabled network 44, which is configured for bi-directional communication with an LTE-M enabled security sensor 48 (like that which may be installed for protection of property). Although the above-described system addresses a security system, other systems having differing types of sensors and sensor technologies are also contemplated.

In like manner as has been explained with reference to FIG. 8, sensor node 46 is contemplated to transmit each of its uplink, downlink and priority bin information, as shown by the exemplary framework 30 of FIG. 9A, to the network 44 upon initialization. Once initialized, sensor node 46 is likewise contemplated to conduct appropriate communications with network 44 to provide the information detailed in each of UL and DL Fields in accordance with a preset or changed priority.

Furthermore, in any one of the exemplary use cases, and also generally with respect to the system of FIG. 1, it is contemplated that through use of the described messaging, a node 14 and a network 12 may be configured for communications enabling a setting of one or more power modes of the node 14, including any aspect of mode operation. For instance, it is contemplated that network 12, via one or more back-end devices connected therewith, may be configured to remotely set a given power mode and/or any aspect of a node's operation, including, optionally, one or more aspects of a wake-up interval in PSM and an eDRX cycle in eDRX Mode.

Thus, in these ways, the present embodiments provide apparatuses and methods for controlling data usage on a cellular network through an ability to control a substance, format and timing of communications between a node and such network. Included in such control is an ability for such communications to regulate the power mode of the node. Because of each of these abilities, power consumption at the node is minimized as a result of both decreased processing demand, based on the framework discussed hereinabove, and the regulation of the frequency of communications. Relatedly, a cost of cellular usage may likewise be substantially reduced, when compared with operations according to conventional LTE communications, as a result of the compactness of the communications and ability to schedule the timing thereof.

The present embodiments are not limited to the particular embodiments illustrated in the drawings and described above in detail.

For example, it is contemplated that system 10 may be made to cooperate with any one of available data and connectivity platforms to allow users of nodes 14 to, for instance, manage and distribute information pertinent to the nodes 14 and/or services desired in the administration of the nodes 14. An example of such a platform is CONDUCTOR, available from Link Labs, Inc of Annapolis, Md.

Those skilled in the art will recognize that other arrangements could be devised. The present embodiments encompass every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present embodiments have been described with reference to specific illustrative embodiments, modifications and variations of the present embodiments may be constructed without departing from the spirit and scope of the present embodiments as set forth in the following claims.

While the present embodiments have been described in the context of the embodiments explicitly discussed herein, those skilled in the art will appreciate that the present embodiments are capable of being implemented and distributed in the form of a computer-readable/usable medium (in a variety of forms) containing computer-executable instructions, and that the present embodiments apply equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the embodiments. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EE-PROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present embodiments have been described in detail, those skilled in the art will understand that various changes, substitutions, variations, enhancements, nuances, gradations, lesser forms, alterations, revisions, improvements and knock-offs of the embodiments disclosed herein may be made without departing from the spirit and scope of the embodiments in their broadest form.

What is claimed is:

1. A Long Term Evolution Machine Type Communications Category M1 (LTE-M) apparatus, comprising:
   a communications platform, comprising
      a communicator configured to carry out LTE-M communications to and from an LTE-M enabled network; and
      a controller operatively connected with the communicator, and configured to determine, based upon instructions stored therein, a framework of one or more categorical Uplink Fields, Downlink Fields and Priority Fields defining parameters representing a substance, a format and a transmission timing of a LTE-M communication to and/or from the network, the framework being independently established by the controller, and
      the controller being configured for operative connection with a host controller and an information resource operatively connected with the host controller, the host controller being configured to control an operation and/or a property of the information resource via communication with the communicator,
   wherein the parameters are combinable to decrease a size of the LTE-M communication by shortening a description of messaging of the one or more Uplink Fields, Downlink Fields and Priority Fields, the messaging comprising, with respect to the one or more Uplink Fields, Downlink Fields and Priority Fields, (a) data affecting an operation of the information resource, or (b) data defining a property of the information resource, or (c) a combination of (a) and (b).

2. The LTE-M apparatus of claim 1, wherein:
   the substance, format and transmission timing correspond to one or more information of the information resource.

3. The LTE-M apparatus of claim 1, wherein:
   the communicator is further operable in accordance with power modes comprising a conventional LTE-M power mode, a Power Save Mode (PSM) and an extended Discontinuous Reception (eDRX) Mode.

4. The LTE-M apparatus of claim 3, wherein:
in PSM, the communicator is operable during a wake-up interval to receive one or more communications from the network.

5. The LTE-M apparatus of claim 4, wherein:
the communicator is configured to receive one or more communications from the network that define one or more aspects of the wake-up interval.

6. The LTE-M apparatus of claim 3, wherein:
in eDRX Mode, the communicator is operable between eDRX cycles, which define periods of sleep, to at least receive one or more communications from the network.

7. The LTE-M apparatus of claim 6, wherein:
the one or more communications comprise one or more aspects that define the eDRX cycle.

8. The LTE-M apparatus of claim 3, wherein:
the communicator is operable to receive communications from the network changing one or more of the substance, the format, and the transmission timing of an LTE-M communication from the communicator, as well as the power mode of the communicator and the controller.

9. A method of conducting Long Term Evolution Machine Type Communications Category M1 (LTE-M) communications between a node and a network in which each of the node and the network are LTE-M enabled, the method comprising:
initializing the node for communication with the network;
transmitting, from the node, a framework of one or more categorical Uplink Fields, Downlink Fields and Priority Fields defining parameters corresponding to node-specific information, information of the network, and a timing for transmitting a communication from the node to the network; and
in response to the transmitting, communicating with the network to provide and/or receive messaging in accordance with the one or more respectively corresponding parameters,
the framework being independently established by the node to define the messaging as corresponding to an information resource configured to be operable in accordance with the framework,
wherein the parameters are combinable to decrease a size of a LTE-M communication to and/or from the network by shortening a description of the messaging of the one or more Uplink Fields, Downlink Fields and Priority Fields, the messaging comprising, with respect to the one or more Uplink Fields, Downlink Fields and Priority Fields, (a) data affecting an operation of the information resource, or (b) data defining a property of the information resource, or (c) a combination of (a) and (b).

10. The method of claim 9, wherein:
the communicating to the network is controlled by the node.

11. The method of claim 9, wherein:
the node-specific information in accordance with the one or more respectively corresponding parameters is determined at the node.

12. The method of claim 9, wherein:
one or more of the node-specific information and timing for transmitting a communication from the node is determined in accordance with a message transmitted from the network changing one or more of the respective parameters.

13. The method of claim 12, wherein:
the node is configured to perform an operation in accordance with the message.

14. The method of claim 9, wherein:
the node is operable in accordance with power modes comprising a conventional LTE-M power mode, a Power Saving Mode (PSM) and an extended Discontinuous Reception (eDRX) Mode.

15. The method of claim 14, wherein:
in PSM, the node is operable during a wake-up interval to receive one or more communications from the network.

16. The method of claim 15, wherein:
the node is configured to receive one or more communications from the network that define one or more aspects of the wake-up interval.

17. The method of claim 14, wherein:
in eDRX Mode, the node is operable between eDRX cycles, which define periods of sleep, to at least receive one or more communications from the network.

18. The method of claim 15, wherein:
the one or more communications comprise one or more aspects that define the eDRX cycle.

19. In a system comprising a Long Term Evolution Machine Type Communications Category M1 (LTE-M) enabled node configured for operation with a LTE-M enabled network, each of the node and the network being configured to transmit and receive communications therebetween, the node comprising:
a controller configured to establish a framework of one or more categorical Uplink Fields, Downlink Fields and Priority Fields defining parameters representing a substance of, a format of, and a timing for transmitting a LTE-M communication from the node, in which
the framework is independently established by the node to define messaging corresponding to an information resource configured to be operable in accordance with the framework, and
the node is configured to be operable in power modes each corresponding to a respective level of power consumption of the node resulting from a frequency of LTE-M communications received by and transmitted from the node,
wherein the parameters are combinable to decrease a size of the LTE-M communications by shortening a description of the messaging of the Uplink Fields, Downlink Fields and Priority Fields, the messaging comprising, with respect to the one or more Uplink Fields, Downlink Fields and Priority Fields, (a) data affecting an operation of the information resource, or (b) data defining a property of the information resource, or (c) a combination of (a) and (b).

20. The node of claim 19, wherein:
in response to one or more communications received from the network, the node is configured to change one or more portions of the framework.

21. The node of claim 19, wherein:
the power modes comprise a conventional LTE-M power mode, a Power Saving Mode (PSM), and an extended Discontinuous Reception (eDRX) Mode, operation of the node in the PSM and eDRX Mode providing decreases in power consumption respectively corresponding to a length and frequency of wake-up intervals in PSM and eDRX cycles defining periods of sleep in eDRX Mode.

22. The node of claim 19, wherein:
the node is configured to be operable in PSM and/or eDRX Mode.

23. A Long Term Evolution Machine Type Communications Category M1 (LTE-M) enabled communications apparatus configured to communicate with a LTE-M enabled network, the apparatus comprising:
one or more processors executing instructions from a memory for causing the apparatus to be operable according to a framework of one or more categorical Uplink Fields, Downlink Fields and Priority Fields defining parameters representing a substance of, a format of, and a timing for transmitting a LTE-M communication from the apparatus, and in one or more of a plurality of selected power modes, any one of the power modes and/or settings thereof being selectable in response to a LTE-M communication received via the network, in which
the framework is independently established by the apparatus to define messaging corresponding to an information resource configured to operable in accordance with the framework,
wherein the parameters are combinable to decrease a size of the LTE-M communications by shortening a description of the messaging of the one or more Uplink Fields, Downlink Fields and Priority Fields, the messaging comprising, with respect to the one or more Uplink Fields, Downlink Fields and Priority Fields, (a) data affecting an operation of the information resource, or (b) data defining a property of the information resource, or (c) a combination of (a) and (b).

24. The apparatus of claim 23, wherein:
the plurality of power modes comprises a Power Saving Mode (PSM) comprising a wake-up interval.

25. The apparatus of claim 24, wherein:
the communication received from/via the network comprises a setting of the wake-up interval.

26. The apparatus of claim 23, wherein:
the plurality of power modes comprises an Extended Discontinuous Reception (eDRX) Mode comprising an eDRX cycle defining a period of sleep.

27. The apparatus of claim 26, wherein:
the communication received from/via the network comprises a setting of the eDRX cycle.

* * * * *